Aug. 14, 1923.
S. B. MACFARLANE ET AL
1,464,576
TORPEDO
Filed Aug. 9, 1920
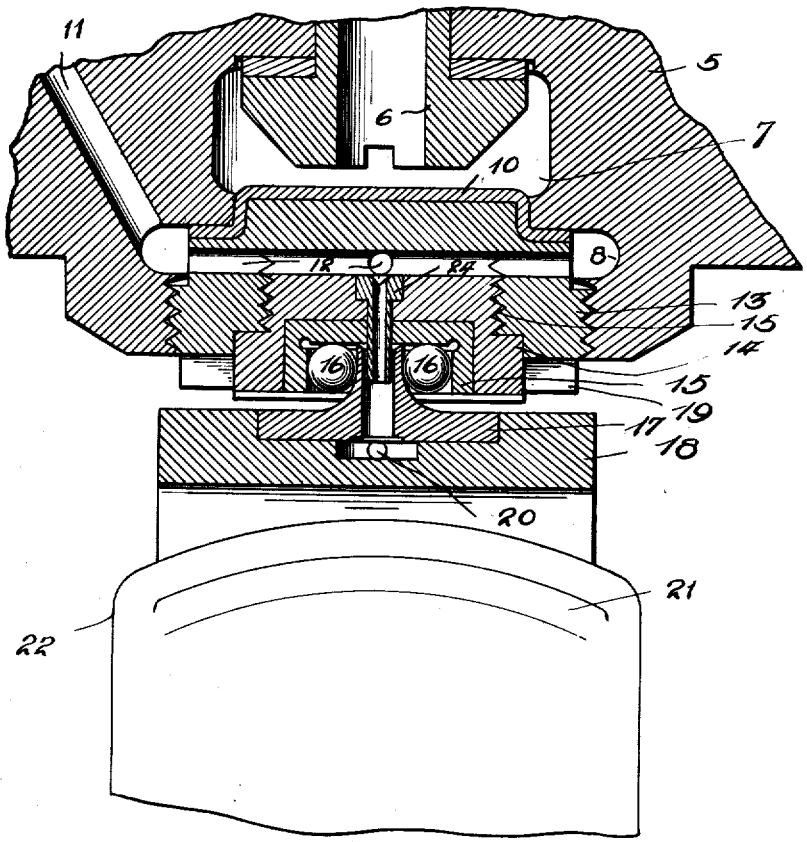
Inventors
S. B. Macfarlane
L. J. Barry
By
Attorney Patented Aug. 14, 1923.

1,464,576

UNITED STATES PATENT OFFICE.

SCOTT B. MACFARLANE AND LOUIS J. BARRY, OF MIDDLETOWN, RHODE ISLAND, ASSIGNORS TO THE GOVERNMENT OF THE UNITED STATES.

TORPEDO.

Application filed August 9, 1920. Serial No. 402,507.

*To all whom it may concern:*

Be it known that we, SCOTT B. MACFARLANE and LOUIS J. BARRY, citizens of the United States, residing at Middletown, Rhode Island, have invented new and useful Improvements in Torpedoes, of which the following is a specification.

This invention relates to improvements in torpedoes and more particularly to improvements in gyro mechanism associated therewith. It is to be understood, however, that while hereinafter described with relation to the application of the invention to torpedoes, it is applicable to other uses wherever gyros are installed.

One of the objects of the present invention is to provide an improved gyro construction wherein certain bearings are made as near leak proof as possible. By way of explanation it may be stated that gyros as now used in torpedoes are driven or maintained spinning by jets of compressed air impinging upon the pockets of the gyro wheel at opposite sides thereof. Heretofore there has been a reduction in efficiency by reason of leakage of the air at various points prior to the outlet nozzle adjacent the pockets. To those familiar with the art it will be obvious that in order to conduct the air to the nozzles it is necessary to pass through several movable joints principally from the source of supply to the outer gimbal ring and from thence to the inner gimbal ring. The present invention deals more specifically with relation to the joint between the outer gimbal ring and the inner gimbal ring and the air conducting passage therethrough.

One of the objects of the present invention is to provide a substantially leak-proof bearing in this location which will not only be of simple and practical construction but one in which the parts may be easily and inexpensively manufactured and assembled.

Other objects will be in part obvious and in part hereinafter pointed out.

In the accompanying drawings there is shown in section the upper part of the gyro pot and associated elements.

Referring now to the drawing in detail, 5 denotes the cover or upper part of the gyro pot. This cover is provided with an opening through which extends a thimble 6 terminating in a chamber 7. This chamber is separated from a secondary chamber 8 by means of a packing member 10. Connected with this chamber 8 is an inlet port 11 which communicates with a plurality of radial passages 12 in the center of threaded block 13 screwing into the cover plate 5. Centrally disposed within this block 13 is a second block 14 having a threaded connection 15 therewith. This block carries a bearing member 23 and ball bearing 16 and in axial relation with the blocks 14 and 15 and communicating with the passageways 12 is a member 24 or extender projecting into a cone-like member 17 carried by the inner gimbal ring 18, which is provided with passageway 20 for conducting the air to the nozzles impinging upon the pockets 21 of the gyro wheel 22. It will be noted that the extender 24 is provided with a through passage of smaller diameter than the passage in the cone 17 or the passage 20, thus the air passing through this extender from the pipes 12 will have a chance to expand thus preventing any back pressure or leakage past the joint between the member 23 and the member 17.

From the above it will be seen that in this manner a leak proof joint is provided between the outer gimbal ring 18 and bearing in gyro pot cover 5. The construction is simple and practical and may be easily manufactured and assembled and is reliable and efficient in use and operation.

Without further analysis, the foregoing will so fully reveal the gist of this invention that others can by applying current knowledge readily adapt it for various applications without omitting certain features that, from the standpoint of the prior art, fairly constitute essential characteristics of the generic or specific aspects of this invention, and, therefore, such adaptations should and are intended to be comprehended within the meaning and range of equivalency of the following claims.

What we claim is:—

1. In a bearing for gyroscopes, a support, a gimbal ring, fluid conducting passages therein, a bearing member mounted in the support, a pivot mounted in the ring, an extender projecting from the bearing member into the pivot, all of said parts having passageways inter-communicating to form a continuous air passage, the passage in said bearing being larger than the passage in said extender.

2. In a bearing for gyroscopes, a support, a gimbal ring, fluid conducting passages therein, a bearing member mounted in the support, a pivot mounted in the ring, an extender projecting from the bearing member into the pivot, all of said parts having passageways inter-communicating to form a continuous air passage, the passage in said bearing being larger than the passage in said extender, and ball bearings interposed between the pivot and the adjacent surfaces of the bearing member.

3. In a bearing for gyroscopes, a recessed support, a bearing member mounted in the recess and a centrally disposed ball raceway in said bearing member, a fluid passageway leading through said support, bearing member and raceway and a tubular pivot mounted in the gimbal ring having its edge engaging said raceway, bearings interposed between the raceway and pivot, an extender associated with said bearing member and extending into said tubular pivot thereby to provide an injector action at the pivot point, the diameter of the extender passageway being smaller than the diameter of the pivot passageway.

Signed at New York city this 7th day of May, 1920.

SCOTT B. MACFARLANE.

Signed at Newport, Rhode Island, this 22nd day of April, 1920.

LOUIS J. BARRY.